United States Patent

[11] 3,549,856

| [72] | Inventor | John F. Saenger, Jr.<br>Springfield, N.J. |
|---|---|---|
| [21] | Appl. No. | 663,010 |
| [22] | Filed | Aug. 24, 1967 |
| [45] | Patented | Dec. 22, 1970 |
| [73] | Assignee | Union Carbide Corporation<br>a corporation of New York |

[54] GAS METAL ARC WELDING FROM ONE SIDE
8 Claims, 1 Drawing Fig.

| [52] | U.S. Cl. | 219/137,<br>219/123 |
|---|---|---|
| [51] | Int. Cl. | B23k 9/08 |
| [50] | Field of Search | 219/130,<br>74, 137, 123 |

[56] References Cited
UNITED STATES PATENTS

| 1,246,658 | 11/1917 | Reid | 219/123 |
|---|---|---|---|
| 1,604,180 | 10/1926 | Lincoln | 219/123X |
| 2,756,311 | 7/1956 | Persson et al. | 219/130 |
| 3,122,629 | 2/1964 | Manz | 219/130X |
| 3,163,743 | 12/1964 | Wroth et al. | 219/137 |
| 3,274,371 | 9/1966 | Manz et al. | 219/130X |

OTHER REFERENCES

Holt, R. W., " Methods of Controlling Arc Blow," The Welding Engineer, April, 1932, pps. 44-46.

*Primary Examiner*—J. V. Truhe
*Assistant Examiner*—J. G. Smith
*Attorneys*—Paul A. Rose, Thomas I. O'Brien and Dominic J. Terminello ABSTRACT: A process for gas metal arc welding thick workpieces forming a grooved joint from one side which consists of locating a current carrying conductor contiguous to the arc welding electrode, to directionally control the arc by selectively varying the current in the current carrying conductor. As a consequence of the tendency of the arc to deflect opposite to the direction of welding in a groove welding process, the DC power connections to the current carrying conductor and the arc electrode are of opposite polarity. The current carrying conductor can either be a consumable or nonconsumable type. In the case of the latter type, the feed rate and wire diameter are selected so that there will be a desired arcless melt-off, but preferably the power is maintained below a level where the melt-off will be substantial.

PATENTED DEC22 1970 3,549,856
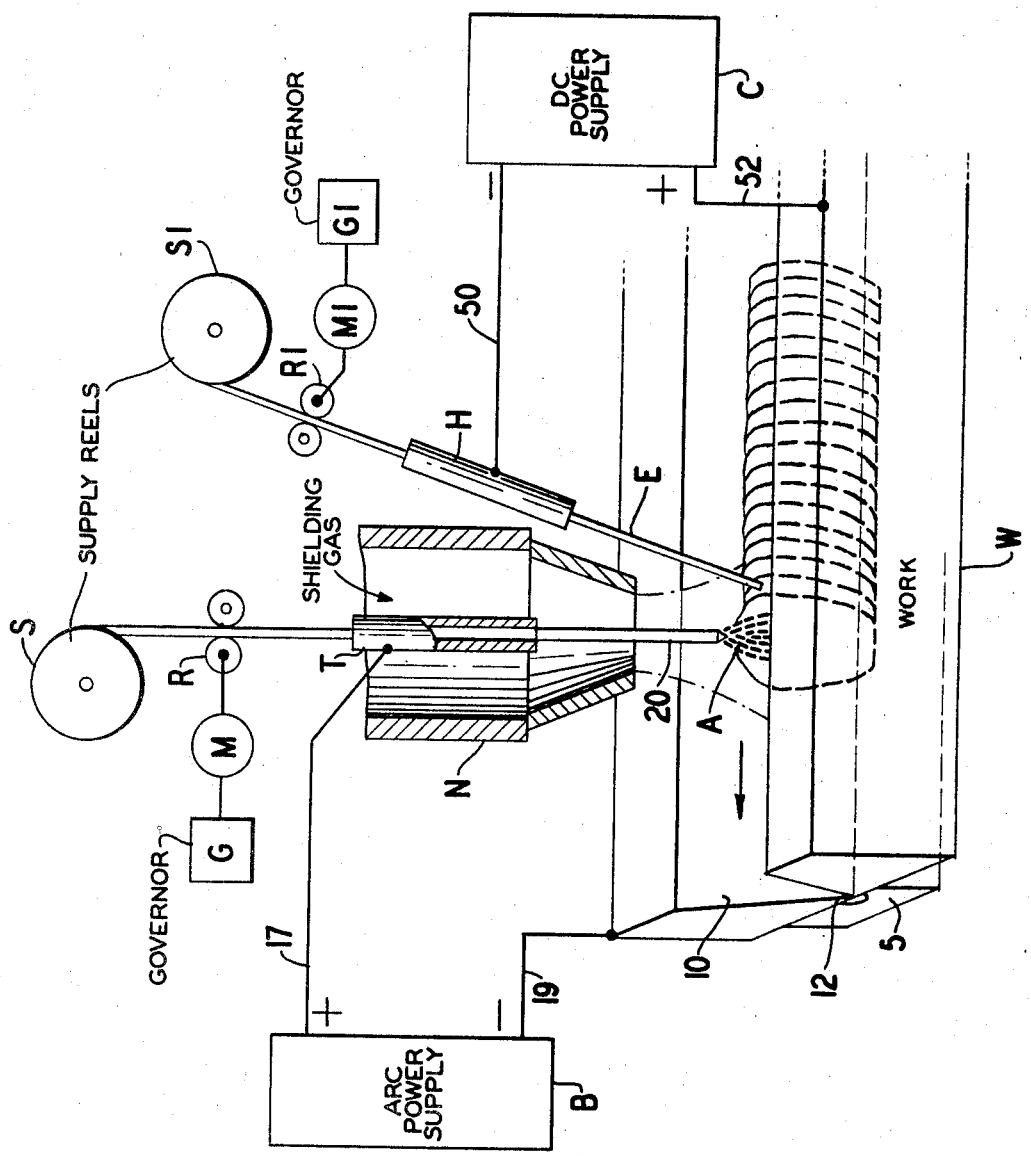
INVENTOR
JOHN F. SAENGER, JR.
BY
Domini Hemmeth
ATTORNEY

GAS METAL ARC WELDING FROM ONE SIDE

This invention relates to a process for welding thick plates and more particularly to a process for arc welding thick plate material from one side.

Joining plates of a given material together by welding requires different edge preparation techniques for different plate thicknesses. The thickness of the plate determines the amount and kind of edge preparation required for the particular welding process involved. For example, when welding with the gas metal arc (MIG) welding process where the thickness of the plate material is about 3/16 inch or thinner, a square butt joint welded from one side is all that is necessary. For thicker plate material approaching 3/8 inch thickness beveling of the faying edges becomes necessary. However, the welding operation may still be carried out from one side to produce a fully penetrated sound joint. Where the plates to be welded have at least a thickness of about 3/8 inch, hereinafter referred to and defined as thick plate, welding with the gas metal arc (MIG) process has been confined generally to a two sided process. In such a process, the edges of the plates to be welded together are beveled on both sides and butted to form a double "V" or U" grooved joint. The side of the base plate upon which the major welding operation is desirably performed is referred to as the top side, the other being the bottom or underside. Accordingly, the underside of the base plate is welded first, the plate then turned right side up or vice versa and the welding operation completed. The above procedure has numerous disadvantages of which the following are specifically noted:

a. Preparation of double sided joints is more complicated and costly than that of single beveled joints;
b. Turning the plates over to weld from the underside is a cumbersome, time consuming and expensive operation, especially when large assemblies are involved such as for example when welding ship hull assemblies; and
c. Considerable metal removal by grinding or chipping is normally required before the reverse side can be welded.

At present no satisfactory technique exists for MIG welding thick plates from only one side. The reason a satisfactory weld cannot be obtained when welding from one side in the joint formed between thick plates is found directly attributable to erratic penetration at the root of the groove. This condition is believed caused by a phenomenon known to the art as "arc blow." The term "arc blow" refers to the deflection of the arc from its desired position during the welding operation. Investigation has revealed that "arc blow" is a result of the asymmetric magnetic field surrounding the path of the welding current. Arc blow occurs primarily in groove welding where the arc is deflected opposite to the direction of welding diminishing the effect of the arc on the area being welded. When an attempt is made to produce a root pass in the grooved joint between two thick plates from one side, within the preferred welding speed range of about 10—30 inches/minutes, "arc blow" becomes so severe that consistent penetration is rendered impossible.

It is, therefore, a primary object of this invention to provide a process for arc welding thick plates from one side.

It is a further object of this invention to provide such a process wherein arc blow is substantially controlled.

It is a still further object of this invention to provide such a process wherein a uniform penetration pattern is achieved.

It is another object of this invention to provide such a process wherein the plates to be welded may be flame beveled to form the grooved joint requiring no further preparation.

Further objects and features of the invention will become apparent from a reading of the following specification and claims in connection with the accompanying drawing.

The single FIG. drawing is a perspective view of a welding setup illustrating the invention.

This invention takes advantage of a fundamental phenomenon of electricity, namely, that two current-carrying conductors lying contiguous to one another will repel or attract each other depending solely upon the direction of the currents. This results from the interaction of the magnetic fields about each conductor. A more advanced discussion relating to the characteristic effects of a magnetic field upon a welding arc can be found in a publication by G. H. Hicken and C. E. Jackson entitled "The effects of Applied Magnetic Fields on Welding Arcs" in the Welding Journal of Nov. 1966, pp. 515—524. Accordingly, the electric arc in a welding system representing one current-carrying conductor can be directionally controlled by another current-carrying conductor. The other current-carrying conductor can be external to the system i.e. independent of the welding operation or part of the welding operation such as another welding arc. A current-carrying conductor is meant to include any medium through which current can flow.

Referring now to the drawing which represents the preferred welding setup for welding thick plate material from one side, a consumable wire electrode 20 is drawn from a supply reel S by feed rolls R which is driven by motor M under the control of Governor G. The feed rolls R direct electrode 20 through a contact guide tube T down into the grooved joint 10 formed in the workpiece W. The workpiece W has a minimum thickness of about 3/8 inch. The grooved joint 10 is shown of "V" construction for illustrative purposes only. The invention is not to be considered limited to any specific grooved joint design. The apex or root 12 of the grooved joint 10 represents the bottom of the groove or the line of contact between the beveled edges of the plates if butted together as shown in the drawing. Power Supply B is connected by lead 17 to contact guide tube T and by lead 19 to the workpiece W. The electrode 20 is lowered into contact with root 12 of the grooved joint 10 of workpiece W. Current instantaneously flows from the power supply through the electrode and workpiece melting the tip of the electrode to initiate an arc. A suitable shielding gas is passed through nozzle N to shield the arc from the atmosphere. Pure argon may be used as the shielding gas or argon in combination with carbon dioxide or a mixture of argon, carbon dioxide and oxygen. The preferred shielding gas for the embodiment shown and described is the latter mixture in the following proportion: argon 92 percent, $CO_2$ 6 percent, and $O_2$ 2 percent. It is to be understood that the invention is not limited to any particular shielding gas and in fact, a shielding flux may be employed in place of the shielding gas. An additional auxiliary shield (not shown) can be used to clear air from the narrow groove. The electrode is moved (by apparatus not shown) relative to the work in a direction of travel shown by the arrow in the diagram. The range of travel speed is 10—30 inches/minutes.

Located in the vicinity of the arc A is a second current-carrying conductor E. Conductor E may represent any current-carrying medium, preferably solid, which may take the form of a consumable or nonconsumable electrode. Broadly, the invention contemplates varying the current in conductor E to directionally control arc A such that a predetermined orientation is maintained between arc A and the workpiece W as the electrode 20 moves relative to the workpiece W. Conductor E lies within the grooved joint 10 contiguous to electrode 20. The position of conductor E, the direction of current flow therein and the magnitude of the current determine the influence of conductor E on the arc A. Conductor E is preferably placed behind the arc in a vertical plane passing through the longitudinal axis of the weld, at an angle up to about 30° with respect to electrode 20 as measured in the vertical plane and moved therewith in the same direction and at the same speed. Current is fed through conductor E in a direction opposite to the direction of current flow in electrode 20 to deflect arc A away from conductor E. Power supply C is connected to contact guide tube H through lead 50 and to the workpiece through lead 52. The current through conductor E is variably controlled by the power supply C.

For purposes of this invention it is desire desirable that no arc be established between conductor E and the workpiece. If an arc should develop between conductor E and the workpiece effective control of the primary arc A would be rendered substantially more difficult since arc A will impose a force upon the second arc which will alter the forces acting upon itself. Moreover, the introduction of a second arc to the weld may alter the characteristics of the weld. To prevent an arc from developing between the solid conductor E and the workpiece, a low voltage power supply may be employed.

Conductor E is lowered into the grooved joint 10 from supply reel S1 through contact guide tube H by feed rolls R1 driven by motor M1 under the control of Governor G1. Although it is preferred that an arc is not established between conductor E and the workpiece, conductor E is not prevented from depositing some metal to the weld puddle by $I^2R$ heating. For a given control current the diameter of the wire used will determine the amount of metal that may be deposited by $I^2R$ heating. A process of depositing metal without an arc by $I^2R$ heating is taught in U.S. Pat. No. 3,122,629, granted to A. F. Manz. The primary object of this patent is to achieve a high deposition rate as a function of the $I^2R$ heating effect. This is accomplished by initially selecting a wire speed and diameter and then providing an appropriate current to achieve a desired melt-off rate. In the present invention, high deposition by $I^2R$ heating is undesirable, the major objective being control of the arc position to achieve consistent penetration. Depending upon the groove configuration a certain amount of deposition of $I^2R$ heating may be necessary, but too much will cause the weld puddle to flow under and ahead of the arc. This may prevent full penetration. Furthermore, if the weld puddle becomes too deep, due to excess I2R deposition, the weld may crack. Accordingly, it is preferred that the diameter of the wire be made large enough such that the amount of metal deposited by $I^2R$ heating is relatively small. Of course, if the diameter of the wire is chosen such that no additional metal may be deposited, a wire driving assembly is unnecessary. In such situation the wire is lowered by manual means and is maintained in physical contact with the workpiece by some simple fixturing hookup. In fact, in such case a nonconsumable wire of a refractory material may be employed.

The workpiece W is mounted on a backup plate 5 generally by being clamped thereto. The backup plate 5 is composed of conductive material such as copper. A semicircular groove is cut in the surface of the backup plate and the root 12 of the workpiece W positioned in the center thereof. The purpose of the contoured backup plate is to protect the underside of the workpiece W during the welding operation from atmospheric contamination and also to act as a mold for the underbead to produce a uniform appearance.

A typical example of welding conditions for the embodiment shown and described is as follows:
Material: ¾-inch carbon steel plates.
Preparation: 50° included angle, flame beveled.
Plates butted together over a copper backup plate.
Welding current—540 amperes.
Welding voltage—27 volts.
Welding speed—16 inches/min.
Conductor E current—270 amperes.
Conductor E voltage—4 volts.
Conductor E—1/16 inch diameter Carbon Steel Linde 85 (AWSE70S-4).
Electrode 20—3/32 inch diameter Carbon Steel Linde 85 (AWSE70S-4).
Shielding Gas—92% argon, 6% $CO_2$, 2% oxygen.

Other modifications and variations of the present invention are possible in the light of the present teachings without departing from the underlying scope of the invention.

I claim:
1. In an arc welding process for welding thick workpieces from one side comprising:
   a. forming a groove between said workpieces;
   b. establishing an arc between an electrode and the groove formed between said workpieces;
   c. maintaining relative motion between said electrode and the work;
   d. directing the arc to the root of said groove; wherein the improved steps comprise:
   e. directing a single solid DC current carrying metal wire into said groove behind the arc, at an angle up to about 30° with respect to the electrode as measured in a vertical plane, in the direction of welding and in sufficient proximity to the arc such that the magnetic field produced about the solid metal wire will substantially interact with the magnetic field produced about the arc;
   f. adjusting the polarity and magnitude of the direct current in said metal wire to directionally deflect said arc forward with respect to the direction of welding; and
   g. maintaining the magnitude of the direct current in said metal wire below the level which would cause substantial melting of said wire.

2. A process according to claim 1 wherein the wire is an continuously fed consumable electrode so as to maintain a continuous arcless short circuit between the end of the wire and the work.

3. A process as defined in claim 2 wherein the wire is moved relative to the work at the same speed as said electrode.

4. A process as defined in claim 1 wherein the electrode is moved relative to the work at a range of travel speed of 10—30 inches/minutes.

5. A process as defined in claim 1 including mounting the work upon a backup plate.

6. A process according to claim 5 wherein the backup plate is copper and has a contoured surface upon which the groove of the work is seated.

7. A process as defined in claim 1 wherein said electrode is consumable and said arc is shielded by a gas.

8. A process as defined in claim 7 wherein said gas consists substantially of 92 percent argon, 6 percent $CO_2$ and 2 percent $O_2$.